Aug. 14, 1951  E. G. LINTON  2,564,266
COLLAPSIBLE PUSH CART
Filed Dec. 6, 1946  3 Sheets-Sheet 2
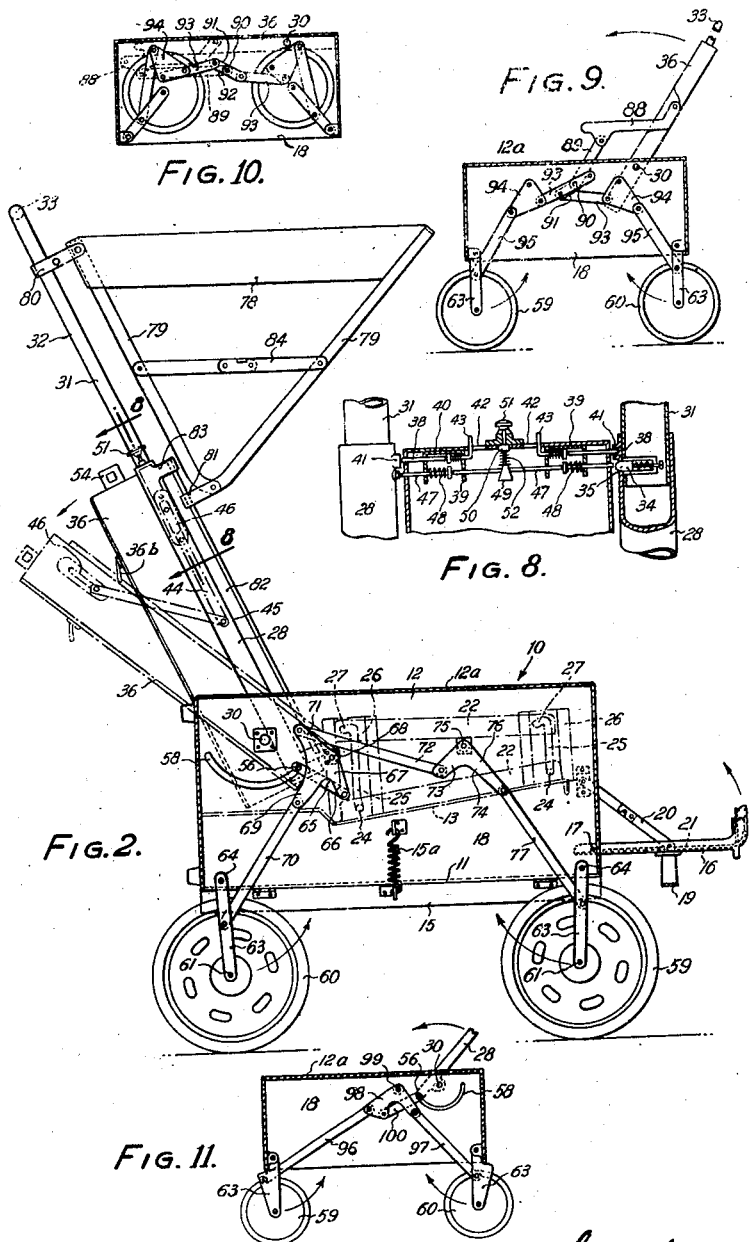

Aug. 14, 1951     E. G. LINTON     2,564,266
COLLAPSIBLE PUSH CART
Filed Dec. 6, 1946     3 Sheets-Sheet 3
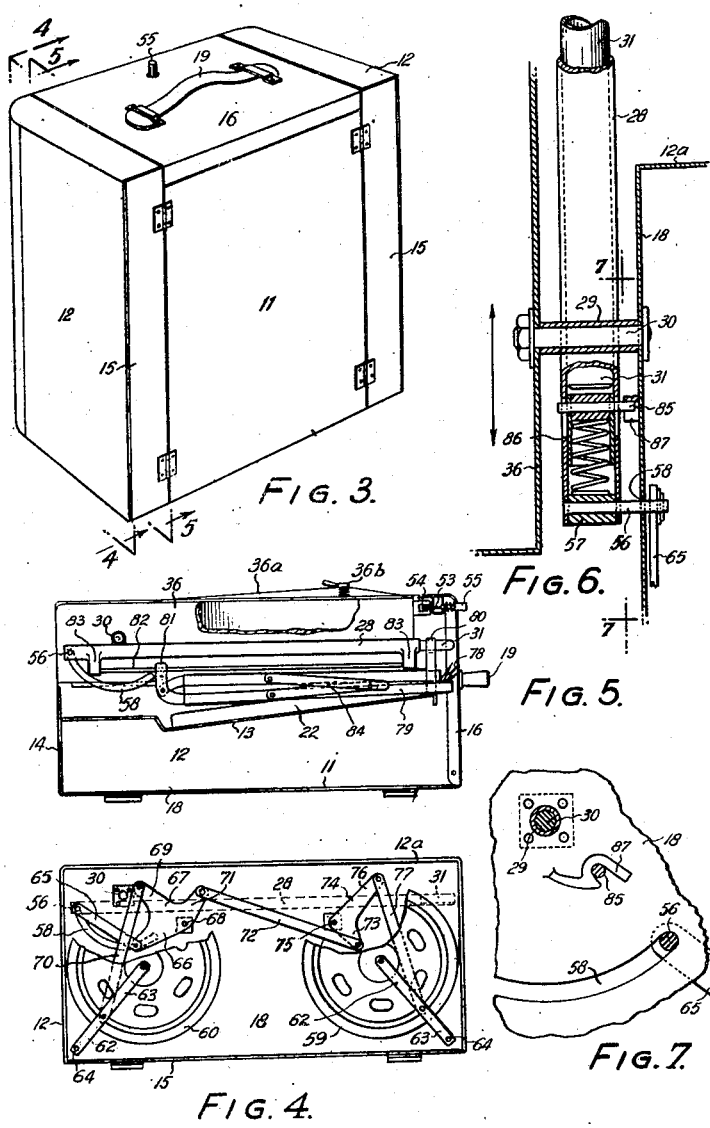
Inventor:
E. G. Linton
By C. F. Wenderoth
Atty Patented Aug. 14, 1951

2,564,266

UNITED STATES PATENT OFFICE 2,564,266

COLLAPSIBLE PUSHCART

Ernest George Linton, Brighton, Victoria, Australia

Application December 6, 1946, Serial No. 714,561
In Australia December 24, 1945

7 Claims. (Cl. 280—37)

This invention relates to push carts and like baby carriages of the type having retractable or foldable wheels and adjustable handles, for the purpose of reducing the size of compass for general convenience in handling and transportation.

Such push carts are preferred for simplicity in travelling on public conveyances and to comply with regulations or conditions permitting the use of the same for transport upon such conveyances.

It has hitherto been proposed to provide a push cart of that general kind which, in the collapsed condition assumes the form of a case which contributes to the handling and transport of the push cart. However, the construction of the push cart mentioned lacks the provision for simply and conveniently collapsing the push cart to the desired case form.

It is considered that the ideal construction of push cart is one that is erectible and collapsible or foldable by the use of one hand whilst holding the infant with the other.

The production of this desirable form of push cart constitutes the principal object of this invention in which the opening for use and the folding or collapsing operation are conveniently facilitated without requiring separate adjustments of the wheels and other parts of the push cart.

Another object is to provide a collapsible push cart which is closed to form a convenient case for carrying or transportation and which is opened into a running position for use, the opening and closing being performed by manual operation of a handle whereby the push cart is also propelled in travel.

A further object is the provision of a back rest adjustable relatively to and movable with the propelling handle in the opening and closing movements of the latter, and comprising a member of the case in the closed position.

Another object is the provision of a push cart collapsible to comprise a case housing the wheels, propelling handle, and hood, and having connectible and relatively separable wall sections comprising the closure members of the case.

Yet another object is to provide a push cart collapsible to case form, and having two releasably connectible and relatively separable wall sections comprising the closure members of the case, one of the wall sections in the running position comprising a back rest and the other a foot rest.

The invention will be better understood from the following description of the practical arrangements of a collapsible push cart depicted in the accompanying drawings.

In these drawings—

Fig. 2 is a slide elevation, partly in section, on the line 2—2 of Fig. 1.

Fig. 3 is a view in perspective of the transportable case formed by collapsing the push cart shown by Figs. 1 and 2.

Figure 1:
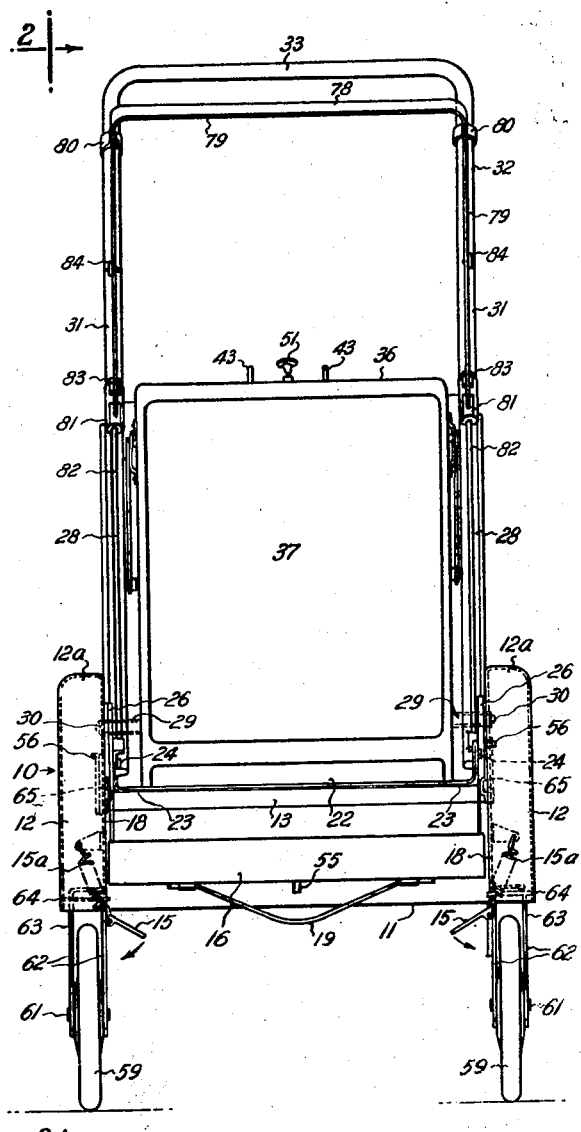
Fig. 1 is a front elevation of the collapsible push cart.

Figs. 4 and 5 are sectional elevations on the planes 4—4 and 5—5 respectively of Fig. 3.

Fig. 6 is a fragmentary sectional detail of part of the propelling means of the push cart.

Fig. 7 is a fragmentary sectional elevation on the line 7—7 of Fig. 6.

Fig. 8 is a fragmentary transverse section on the line 8—8 of Fig. 2.

Figs. 9 and 10 are sectional elevations of a modified wheel extending and retracting means, showing the wheels in running and retracted arrangement respectively.

Fig. 11 is a sectional elevation of a further modified wheel extending and retracting means, showing the wheels in running position.

In these drawings, the numeral 10 indicates generally a frame or carriage body constructed of suitable sheet material of required gauge or thickness, and comprising a base 11, hollow side walls 12, and a transverse bracing member 13 and a rear end wall 14 rigidly interconnecting and maintaining the side walls 12 in fixed relationship.

The hollow side walls 12 are closed at the top by portions 12a, while at the base the hollow walls are open but are provided with flaps or doors 15 hinged to the base 11 and provided with closing springs 15a.

In the closed case arrangement shown by Fig. 3, the base 11 and the flaps 15 are positioned coextensively to form a side of the case, but in the running arrangement, see Fig. 2, the flaps 15 are open and dependent from the base 11.

At the forward end of the body 10, there is a hinged or drop down wall 16 which is supported by the side walls 12 upon co-axially aligned pivots 17 secured to the inner plates 18 of the hollow side walls 12.

The hinged wall 16 in the collapsed arrangement of the push cart lies between the hollow side walls 12 and together with the latter comprises the top or upper side of the closed case, and said hinged wall is provided with a handle 19 for carrying the case about, see Fig. 3.

In the running or open arrangement of the push cart, the hinged wall 16 is located in a substantially horizontal position, which is effected by angular displacement of the latter upon the co-axially aligned pivots 17 in opening the push cart from case form to running arrangement. The hinged wall 16 is supported in the horizontal position by foldable stays 20 pivotally connected to the side walls 12, to form a foot rest or support, and is for this purpose provided with a suitable covering or lining 21, see Fig. 2.

Positioned between the side walls 12 and normally supported upon the transverse bracing member 13, is a seat 22 from opposite sides of which project brackets 23 carrying coaxially aligned pins 24 in engagement with upwardly extending guide slots 25 formed in supporting members 26 secured to the inner plates 18 of the side walls 12. The slots 25 are provided with horizontally disposed extensions 27, and it will be apparent that the seat 22 may be raised to an upper position wherein it is supported by engagement of the pins 24 with the guide slot extensions 27, see Fig. 2.

Located rearwardly of the seat 22 are upwardly extending tubular lever arms 28 to which are secured, as by welding sleeves 29 which are rotatably supported upon coaxially aligned spindles or journals 30 fixed to the inner plates 18 of the hollow side walls 12 and forming fulcra for the opposite lever arms 28, see Figs. 1 and 6.

In the tubular lever arms 28 are slidably fitted the opposite limbs 31 of an inverted U-shaped member 32, the upper side or cross piece 33 of which comprises a handle whereby the push cart is propelled and opened to running arrangement and closed to case form.

The limbs 31 of the member 32 are provided with spring-pressed catches 34, see Fig. 8, which when the limbs are fully extended from the opposite arms 28 engage apertures 35 in the latter to lock the handle 33 in the propelling position as shown in Figs. 1 and 2.

Positioned between the side walls 12 and pivotally supported upon the coaxially aligned journals 30, is a hollow wall member 36, which is suitably padded at 37 to form a back rest, and will be referred to hereinafter as the back rest.

The back rest in the closed arrangement, Figs. 3 and 5, is positioned between the side walls 12 and is flush or level with the top parts 12a of the latter to thereby form a side of the case located oppositely to the side comprised of the base 11 and flaps 15 as previously described herein.

The interior of the back rest 36 comprises a receptacle for goods or articles, and for this purpose is provided with a flexible cover or closure 36a, the edges of which are connectible by a slide fastener 36b of well known construction, see Fig. 5.

The oppositely positioned lever arms 28 are disposed in co-planar parallel arrangement and form a back rest frame to which the best rest 36 is normally connected by spring influenced catches 38 slidably mounted in brackets 39 fixed to the upper end wall 40 of the back rest and engageable with apertured bosses 41 on the lever arms 28, see particularly Fig. 8.

Upon engagement of the catches 38 with the apertured bosses 41 the back rest 36 is locked to and positioned in parallel relation with the back rest frame comprised of the lever arms 28, see Fig. 2.

When the back rest is thus secured to the lever arms 28, the former and the latter may be angularly moved as a unit upon the coaxially aligned spindles or journals 30 which comprise the common pivotal axis of the back rest and the lever arms.

The releasable catches 38 at the inner ends are bent at right angles to extend through slots 42 in the wall 40 and form oppositely movable finger grips 43 whereby the catches 38 may be disengaged from the apertured bosses 41.

Upon release of the catches 38 the back rest 36 may be partially rotated upon the coaxially aligned journals 30 into the position indicated by broken lines in Fig. 2, wherein the back rest is angularly related with the lever arms 28 and the slidably extendable handle supports 31 and is retained by links or arms 44 pivoted at 45 upon the arm 28 and connected to the back rest by slotted guides 46.

It will be understood that by adjustment of the back rest 36 and of the seat 22 as previously described, the former and the latter may be adjustably disposed in angularly related positions to provide several sitting postures and positions of repose for an infant.

In order to release the spring pressed catches 34 to enable the extendable limbs 31 and handle 33 to be collapsed, there are provided push rods 47 which are slidably mounted in the brackets 39, see Fig. 8.

The push rods 47 are maintained by springs 48 in contact with an expanding wedge 49 carried by a stem 50 having thereon a hand grip 51 which upon being drawn upwardly actuates the expanding wedge 49 in opposition to a return spring 52 to thrust the push rods outwardly from the back rest 36 and into contact with the spring pressed catches 34 which are thereby released from the apertures 35 to permit the limbs 31 and handle 33 to be collapsed.

In the closed arrangement, the back rest 36 and the hinged wall 16 are engaged and releasably connected by engagement of a spring influenced latch 53 on the hinged wall with a slotted catch 54 on the back rest, see Fig. 5. The latch 53 is formed with an extension 55, which projects through an aperture in the wall 16 and comprises a press button whereby the latch 53 may be disengaged from the slotted catch to enable the push cart to be opened from case form to running arrangement.

The lever arms 28 are prolonged below the journals or spindles 30, and adjacently to their lower ends the former carry laterally projecting pins 56, see Figs. 1 and 6. The pins 56 are securely fixed in plugs 57 in the lever arms and project through arcuate slots 58 formed in the side wall plates 18 and radiused from the axis of the journals 30.

The wheels 59 and 60 of the push cart are arranged to collapse into the spaces between the inner wall plates 18 and the outer wall plates of the hollow side walls 12, and for this purpose the wheels are arranged in pairs on opposite sides of the push cart, the wheels 59 being in front or leading and the wheels 60 being at the rear or trailing.

The wheels 59 and 60 of each pair are rotatable upon axles 61 carried at the ends of arms 62 comprising the opposite limbs of U-shaped frame members 63 pivotally mounted upon spindles 64 extending through the inner and outer plates of the hollow side walls, see Fig. 1.

The wheels 59 and 60 are extended from and retracted into the spaces within the hollow walls 12 by swinging movements of the U-shaped frame members 63 upon the spindles 64 in response to angular movements of the lever arms 28 upon the co-axially aligned journals 30 effected by manual manipulation of the handle 33.

For the purpose of providing an operative connection of the lever arms 28 with the pivoted members 63 carrying the wheels 59 and 60, the pin 56 carried by each lever arm 28 is connected by a link 65 with an arm 66 of a three-armed lever 67 fulcrumed upon a pivotal support 68 secured to the wall plate 18 through which the pin 56 extends, see Figs. 2 and 4.

A second arm 69 of the three-armed lever 67 is connected by a link 70 with the pivoted member 63 carrying the wheel 60 as previously described, while the third arm 71 of the three-armed lever is connected by a link 72 with an arm 73 of a bell crank lever 74 fulcrumed upon a pivot 75 secured to the wall plate 18. The other arm 76 of the bell crank lever 74 is connected by a link 77 with the pivoted member 63 carrying the leading wheel 59.

A collapsible hood 78 is provided and is carried upon a foldable frame 79 secured at the upper end by clamps 80 to the collapsible limbs 31 and connected at the lower end by slides 81 to guide rails 82 secured to lugs 83 integral with the lever arms 28.

The guide rails 82 are parallel with the lever arms, and it will be understood that the hood frame 79 will move with the opposite limbs 31 as the latter are extended from or collapsed within the lever arms 28, and that the slides 81 will traverse the guide rails 82 during the raising and lowering of the hood frame synchronously with the telescopical movements of the limbs 31.

The hood 78 is maintained taut or stretched for use by foldable interlocking stays 84, which with the frame 79 and hood 78 are folded to lie closely together in the closed case arrangement, see Fig. 5.

Assuming the push cart to be in the case form as shown by Figs. 3 and 5, and that it be desired to convert it to the open or running arrangement, the user actuates the press button 55 and releases the latch 53 from the catch 54, thereby effecting disengagement of the hinged wall 16 from the back rest 36.

The back rest and hinged wall are then opened apart to give access to the handle 33 which is extended by sliding the limbs 31 outwardly in the lever arms 28 until the spring pressed catches 34 engages the apertures 35, thereby releasably securing the handle in fully extended position.

As the back rest 36 and hinged wall 16 are opened, the latter drops forwardly into its lower position, wherein it is supported horizontally by the stays 20 to form a foot rest as previously described.

The handle 33 upon being extended, is drawn rearwardly to angularly displace the lever arms 28 and therewith the back rest 36 upon the co-axially aligned journals 30. Simultaneously, the angular displacement of the lever arms 28 traverses the pins 56 from the rearward end of the arcuate slots 58, see Fig. 4, to the forward end of said slots, see Figs. 2 and 7.

The traversing motion of the pins 56, is by means of the links 65 transferred to the arms 66 of the three-armed levers 67 which are accordingly angularly moved upon the pivotal supports 68.

The angular movement of the levers 67 is transmitted by means of the arms 69 and links 70 to the pivoted frame members 63 carrying the rear wheels 60, which are accordingly displaced from the nested position within the hollow walls 12, see Fig. 4, to the running position shown by Fig. 2.

Simultaneously, the arms 71 of the levers 67 move the front wheels 59 from the nested to the running position by means of the links 72, bell crank levers 74 and links 77 connected to the pivoted frame members 63 whereon the front wheels 59 are carried.

In being thrust from within the hollow walls the wheels 59 and 60 engage and open the hinged flaps 15 in opposition to the springs 15a, and said flaps are maintained open by the pivoted frame members 63 when the wheels are located in the running position.

It will be noticed that in the running position of the wheels, the links 70 and 77 are substantially in longitudinal alignment with the arms 69 and 76 respectively of the levers 67 and 74, and that the links 65 are approximately radial to the journals 30.

The linkage arrangement in the running position is centered and accordingly self locking, so that the wheels 59 and 60 are rigidly maintained in the running position and cannot be displaced therefrom by impact with obstructions encountered in travel. The wheels, accordingly, can be retracted within the hollow walls only by movement of the handle 33 and lever arms 28.

In order to prevent inadvertent displacement of the handle and lever arms, there are provided on the latter slidable safety latches 85 which under influence of springs 86 become engaged with catches 87 secured to the side wall plates 18, as the pins 56 arrive at the forward ends of the arcuate slots 58 corresponding with the full extension of the wheels 59 and 60 into the running position.

Upon the completion of the conversion to the running arrangement, the frame 79 may be extended to expand the hood 78, and the seat 22 and back rest 36 may be adjusted to a required position as previously described herein.

To restore the push cart to case form, the seat 22 and the back rest 36, if displaced, are returned to their normal positions, i. e. upon the bracing member 13 and reconnected with the lever arms 28 respectively, and the hood 78 and hood frame 79 are folded to lie approximately parallel with said lever arms.

The hand grip 51 is then actuated to disconnect the spring-pressed catches 34 from the apertures 35 and set free the limbs 31, which upon being thrust inwardly within the lever arms 28 contact with and disengage the latches 85 from the safety catches 87.

The disengagement of the latches 85 releases the lever arms 28, which upon being angularly adjusted in the forward direction traverse the pins 56 from the forward to the rearward ends of the slots 58 and through the links 65 and 72 actuate the levers 67 and 74 in the reverse direction to retract the wheels 59 and 60 within the walls 12.

As the wheels 59 and 60 recede within the hollow walls 12, the springs 15a maintain the flaps 15 in contact with the sides of the pivoted frames 63 and finally with the wheels until said wheels are within the walls, whereupon the flaps 15 close and conceal the wheels from view as shown by Fig. 3.

Finally the hinged wall 16 is swung upwardly into engagement with the back rest 36, whereupon the latch 53 is reconnected with the catch 54 to complete the restoration to case arrangement.

In the practical arrangement above described, the wheel extending linkage is connected to the propelling means at a point below the pivotal axis of the lever arms 28 i. e. at the side of said axis remote from the handle 33, the lever arms accordingly being of the first order in lever classification.

The propelling means may, however, be arranged as a lever of the second order for connection with said operation of the wheel extending linkage, and moreover, the back rest may itself comprise the wheel linkage operating lever.

Referring to Figs. 9 and 10, the back rest 36 is arranged as a lever of the second order and is pivotally connected at a point between the pivotal axis 30 and the handle 33 to links 88, shaped to form arm rests, which are connected to arms 89 secured to shafts 90 rotatably supported by the inner wall plates 18.

To the shaft 90 there is fixed a lever 91 having equal arms 92 which by links 93 are connected to levers 94 joined by links 95 with the frame arms 63 carrying the wheels 59 and 60.

It will be understood that by movement of the back rest 36 from the inclined position Fig. 9, to the collapsed position Fig. 10, the arm rest links 88 will actuate the arms 89 to rotate the shaft 90 and arms 92 to thereby operate the levers 94 and through the links 95 retract the wheels 59 and 60.

As shown in Fig. 11, the frame arms 63 of both wheels 59 and 60 are connected by links 96 and 97 to one and the same bell crank lever 98 which is pivotally supported at 99 upon the inner side plate 18 and connected by a link 100 to the pin 56 carried by the lever arm 28 and movable by the latter along the slot 58 in the manner previously described.

As illustrated in Fig. 11, the wheels are shown in the running position, wherein the links 96, 97 are substantially centered with the pivotal axis 99 and the link 100 is centered with the pivot 20 of the lever arm 28. The wheels 59 and 60 are, accordingly, automatically locked against inadvertent displacement, but can be retracted by movement of the lever arm 28, as indicated by arrows, to the inoperative position.

I claim:

1. A push cart collapsible to case form and comprising a carriage body having a base, a fixed wall at one end, lateral housings and a bracing member comprising a seat support extending between the lateral housings, the base, the fixed end wall, said housings and the bracing member being secured together to comprise a rigid unitary structure, a foot rest at the other end of the carriage body pivotally supported upon and closable between the lateral wheel housings, pairs of wheels pivotally mounted within the lateral housings for extension from and retraction within said housings, linkages interconnecting each pair of wheels, collapsible propelling means pivotally supported upon the wheel housings, links connecting the collapsible propelling means with each pair of wheels, a back rest connected and coaxially pivoted with the collapsible propelling means, a foldable hood carried by the collapsible propelling means, the wheels and foldable hood responsive to closing movement of the collapsible propelling means being retracted within said housings and the foldable hood and said propelling means being disposed upon the seat support and said back rest being closed between said housings and releasably connected to the pivoted foot rest in the collapsed case form of the push cart.

2. A push cart as claimed in claim 1, having catches on the lateral wheel housings and releasable spring-influenced latches carried by the collapsible propelling means and engageable with the catches to retain said propelling means in the pushing position.

3. A push cart as claimed in claim 1, wherein the collapsible propelling means comprise outer tubular members pivotally supported on the lateral wheel housings, inner tubular members slidably fitting within the outer tubular members, a cross piece comprising a handle integral with the inner tubular members, and releasable resilient detent means maintaining the inner tubular member extended and the handle in the propelling position; and wherein the foldable hood is carried by frames secured at the upper ends to the inner tubular members and slidably engaged at the lower ends with guide rails fixed to and parallel with the outer tubular members.

4. A push cart collapsible to case form and comprising a carriage body having a base, a fixed wall at one end and lateral wheel housings, said base, fixed end wall and housings being rigidly secured together, a movable foot rest at the other end of the carriage body closable between the lateral wheel housings, wheels mounted for extension from and retraction within said housings, a collapsible propelling handle supported on the lateral wheel housings and operatively connected with the wheels to extend and retract said wheels, a back rest operable by the propelling handle to a closed position between the side walls for releasable connection with the foot rest, and spring-influenced closures co-extensive with the base and opened by the wheels in being extended from said housings to the running position.

5. A push cart collapsible to case form and comprising a carriage body having a base, a fixed wall at one end and lateral wheel housings, said base, fixed end wall and housings being rigidly secured together, a movable foot rest at the other end of the carriage body closable between the lateral wheel housings, wheels mounted for extension from and retraction within said housings, a collapsible propelling handle supported on the lateral wheel housings and operatively connected with the wheels to extend and retract said wheels, and a hollow back rest comprising a receptacle for articles operable by the propelling handle to a closed position between the side walls for releasable connection with the foot rest.

6. A collapsible push cart comprising a base, lateral wheel housings, a fixed rear wall section, a front wall section comprising a foot rest pivotally supported upon the lateral wheel housings and closable between said housings, wheels pivotally mounted within the housings, a collapsible propelling handle pivotally supported upon the lateral wheel housings and operatively connected with the pivotally mounted wheels to extend and retract said wheels from and within said housings, a side wall section comprising a back rest coaxially pivoted with and adjustably connectible to the propelling handle for positioning parallel with or angularly to the latter and movable in unison with said handle to a closed position between said housings, and releasable means for connecting said front and rear wall sections whereby the push cart is retained in case form for carrying or transportation.

7. A push cart convertible from a completely closed case form to an open mobile carriage arrangement, comprising a carriage body, wheels connected to the carriage body and extendable from and retractible within the latter, manually actuatable means connected to the body and the wheels and operable for moving the latter to and from the running position and propelling the mobile carriage, an angularly movable part carried by the manually actuatable means, and an angularly movable part pivoted on the carriage body and coactive with the angularly movable part on the manually actuatable means to close the carriage body and conceal said means within said body in the closed case arrangement.

ERNEST GEORGE LINTON.

REFERENCES CITED

The following references are of record in the file of this patent:

UNITED STATES PATENTS

| Number | Name | Date |
| --- | --- | --- |
| 955,783 | Folgeman | Apr. 19, 1910 |
| 1,011,776 | Hamilton | Dec. 12, 1911 |
| 1,021,964 | Beasecker | Apr. 2, 1912 |
| 1,125,441 | Bailey | Jan. 19, 1915 |
| 1,215,085 | Wannenwetsch | Feb. 6, 1917 |

FOREIGN PATENTS

| Number | Country | Date |
| --- | --- | --- |
| 867,582 | France | Nov. 14, 1941 |